(12) United States Patent
Fay

(10) Patent No.: US 11,271,732 B2
(45) Date of Patent: Mar. 8, 2022

(54) ROBUST REPEATABLE ENTROPY EXTRACTION FROM NOISY SOURCE

(71) Applicant: NXP B.V., Eindhoven (NL)

(72) Inventor: Bjorn Fay, Brande-Hörnerkirchen (DE)

(73) Assignee: NXP B.V., Eindhoven (NL)

( * ) Notice: Subject to any disclaimer, the term of this patent is extended or adjusted under 35 U.S.C. 154(b) by 255 days.

(21) Appl. No.: 16/681,443

(22) Filed: Nov. 12, 2019

(65) Prior Publication Data

US 2021/0143994 A1 May 13, 2021

(51) Int. Cl.
| | |
|---|---|
| *G06F 11/00* | (2006.01) |
| *H04L 9/08* | (2006.01) |
| *H04L 9/32* | (2006.01) |
| *H03M 1/00* | (2006.01) |

(52) U.S. Cl.
CPC ............ *H04L 9/0866* (2013.01); *H03M 1/00* (2013.01); *H04L 9/3278* (2013.01)

(58) Field of Classification Search
CPC ....... H04L 9/0866; H04L 9/3278; H03M 1/00
See application file for complete search history.

(56) References Cited

U.S. PATENT DOCUMENTS

| | | | | |
|---|---|---|---|---|
| 8,516,269 | B1 * | 8/2013 | Hamlet | G06F 21/445 713/189 |
| 10,002,277 | B1 * | 6/2018 | Endress | H04L 9/3278 |
| 10,469,059 | B1 * | 11/2019 | Hars | G06F 1/08 |
| 2001/0010724 | A1 * | 8/2001 | Murakami | H04L 9/0866 380/286 |
| 2010/0031065 | A1 * | 2/2010 | Futa | H04L 9/0866 713/194 |
| 2011/0215829 | A1 * | 9/2011 | Guajardo Merchan | H01L 23/544 326/8 |

(Continued)

OTHER PUBLICATIONS

Hiller, M., et al., "Complementary IBS: Application specific error correction for PUFs", Proceedings of the 2012 IEEE International Symposium on Hardware-Oriented Security and Trust, HOST 2012. (2012) (10.1109/HST.2012.6224310).

(Continued)

*Primary Examiner* — Phy Anh T Vu

(57) ABSTRACT

Various embodiments relate to a method for generating a bit stream in a physical unclonable function (PUF) system, including: receiving a set of values from a plurality of physical devices in the PUF system in a first order; sorting the set of values into a second order; for each of the L highest values, setting a corresponding levelTag value to a first bit value and setting a corresponding usageTag value to a first usage value that indicates that the levelTag for the corresponding value is to be used to generate the bit stream, wherein L is a level setting; for each of the L lowest values, setting a corresponding levelTag value to a second bit value and setting a corresponding usageTag value to the first usage value, wherein the first bit value is different from the second bit value; setting the usageTag value for all other values that are not the highest L values or the lowest L values to a second usage value that indicates that the corresponding value is not to be used to generate the bit stream; generating the bitstream as the levelTag values that have an associated usageTag value of the first usage value, wherein the levelTag values are ordered according to the first order.

20 Claims, 2 Drawing Sheets

(56) References Cited

U.S. PATENT DOCUMENTS

| | | | | |
|---|---|---|---|---|
| 2012/0293354 A1* | 11/2012 | Suzuki | ............. | G06F 7/588 |
| | | | | 341/173 |
| 2013/0246881 A1* | 9/2013 | Goettfert | ............. | H03M 13/00 |
| | | | | 714/752 |
| 2013/0293274 A1* | 11/2013 | Shimizu | ............. | H03K 3/02 |
| | | | | 327/215 |
| 2014/0132304 A1* | 5/2014 | Haiut | ............. | H04R 3/005 |
| | | | | 326/52 |
| 2014/0201851 A1* | 7/2014 | Guo | ............. | G06F 1/26 |
| | | | | 726/34 |
| 2018/0131528 A1* | 5/2018 | Profumo | ............. | H04L 9/0861 |
| 2018/0159685 A1* | 6/2018 | Kwak | ............. | H04L 9/0866 |
| 2020/0104101 A1* | 4/2020 | Satpathy | ............. | H04L 9/0866 |

OTHER PUBLICATIONS

Suh, E.G., et al. "Physical unclonable functions for device authentication and secret key generation", In Proceedings of the 44th annual Design Automation Conference (DAC '07). ACM, New York, NY, USA, 9-14. (2007) (DOI: https://doi.org/10.1145/1278480.1278484).

* cited by examiner

ROBUST REPEATABLE ENTROPY EXTRACTION FROM NOISY SOURCE

TECHNICAL FIELD

Various exemplary embodiments disclosed herein relate generally to robust repeatable entropy extraction from noisy source.

BACKGROUND

For physical unclonable functions (PUFs) one usually must extract some digital values from analog sources in a way that the same value can be extracted again by using some helper data. If there is noise in these sources, which is normally the case, then some error correction needs to be added on top to remove these errors. The more noise there is the more error correction is needed, which typically is quite expensive in the sense that more and more analog sources are needed, and hence also more helper data is needed. This approach only works up to an error rate of <50%, but typically is only implemented up to 25-40%, because then the coding overhead and effort becomes too great.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for generating a bit stream in a physical unclonable function (PUF) system, including: receiving a set of values from a plurality of physical devices in the PUF system in a first order; sorting the set of values into a second order; for each of the L highest values, setting a corresponding levelTag value to a first bit value and setting a corresponding usageTag value to a first usage value that indicates that the levelTag for the corresponding value is to be used to generate the bit stream, wherein L is a level setting; for each of the L lowest values, setting a corresponding levelTag value to a second bit value and setting a corresponding usageTag value to the first usage value, wherein the first bit value is different from the second bit value; setting the usageTag value for all other values that are not the highest L values or the lowest L values to a second usage value that indicates that the corresponding value is not to be used to generate the bit stream; generating the bitstream as the levelTag values that have an associated usageTag value of the first usage value, wherein the levelTag values are ordered according to the first order.

Various embodiments are described, further including outputting the usageTag values from the PUF system.

Various embodiments are described, wherein generating the bitstream as the levelTag values includes generating the first 2L-1 bits and ignoring the last generated bit.

Various embodiments are described, further including receiving n sets of values and repeating the method claim 1 for each of the n set of values.

Various embodiments are described, wherein the size of each of the n sets of values is set based upon the resources needed to sort the set of values.

Various embodiments are described, wherein the value of L is determined based upon the noise level of the physical devise in the PUF system.

Further various embodiments relate to a method for generating a bit stream in a physical unclonable function (PUF) system, including: receiving a set of values from a plurality of physical devices in the PUF system in a first order; receiving a set of usageTag values associated with the set of values, wherein a first usage value indicates that the levelTag for the corresponding value is to be used to generate the bit stream and a second usage value indicates that the corresponding value is not to be used to generate the bit stream; generating a subset of the set of values, wherein the subset of values includes values with an associated usageTag value of the first usage value; sorting the subset of values into a second order; for each of the L highest values in the subset, setting a corresponding levelTag value to a first bit value, wherein L is a level setting; for each of the L lowest values in the subset, setting a corresponding levelTag value to a second bit value, wherein the first bit value is different from the second bit value; generating the bitstream as the levelTag values, wherein the levelTag values are ordered according to the first order.

Various embodiments are described, further including outputting the bitstream from the PUF system.

Various embodiments are described, wherein generating the bitstream as the levelTag values includes generating the first 2L-1 bits and ignoring the last generated bit.

Various embodiments are described, further including receiving n sets of values and repeating the method claim 6 for each of the n set of values.

Various embodiments are described, wherein the size of each of then sets of values is set based upon the resources needed to sort the subset of values.

Various embodiments are described, wherein the value of L is determined based upon the noise level of the physical devise in the PUF system.

Further various embodiments relate to a physical unclonable function (PUF) system, including: a memory; a processor coupled to the memory, wherein the processor is further configured to: receive a set of values from a plurality of physical devices in the PUF system in a first order; sort the set of values into a second order; for each of the L highest values, set a corresponding levelTag value to a first bit value and set a corresponding usageTag value to a first usage value that indicates that the levelTag for the corresponding value is to be used to generate the bit stream, wherein L is a level setting; for each of the L lowest values, set a corresponding levelTag value to a second bit value and set a corresponding usageTag value to the first usage value, wherein the first bit value is different from the second bit value; set the usageTag value for all other values that are not the highest L values or the lowest L values to a second usage value that indicates that the corresponding value is not to be used to generate the bit stream; generate the bitstream as the levelTag values that have an associated usageTag value of the first usage value, wherein the levelTag values are ordered according to the first order.

Various embodiments are described, wherein the processor is further configured to output the usageTag values from the PUF system.

Various embodiments are described, wherein generating the bitstream as the levelTag values includes generating the first 2L-1 bits and ignoring the last generated bit.

Various embodiments are described, wherein the processor is further configured to receive n sets of values and repeat the processor steps of claim 11 for each of then set of values.

Various embodiments are described, wherein the size of each of the n sets of values is set based upon the resources needed to sort the set of values.

Various embodiments are described, wherein the value of L is determined based upon the noise level of the physical devise in the PUF system.

Further various embodiments relate to a physical unclonable function (PUF) system, including: a memory; a processor coupled to the memory, wherein the processor is further configured to: receive a set of values from a plurality of physical devices in the PUF system in a first order; receive a set of usageTag values associated with the set of values, wherein a first usage value indicates that the levelTag for the corresponding value is to be used to generate the bit stream and a second usage value indicates that the corresponding value is not to be used to generate the bit stream; generate a subset of the set of values, wherein the subset of values includes values with an associated usageTag value of the first usage value; sort the subset of values into a second order; for each of the L highest values in the subset, set a corresponding levelTag value to a first bit value, wherein L is a level setting; for each of the L lowest values in the subset, set a corresponding levelTag value to a second bit value, wherein the first bit value is different from the second bit value; generate the bitstream as the levelTag values, wherein the levelTag values are ordered according to the first order.

Various embodiments are described, wherein the processor is further configured to output the bitstream from the PUF system.

Various embodiments are described, wherein generating the bitstream as the levelTag values includes generating the first 2L-1 bits and ignoring the last generated bit.

Various embodiments are described, wherein the processor is further configured to output the bitstream from the PUF system receive n sets of values and repeating the processor steps claim 16 for each of the n set of values.

Various embodiments are described, wherein the size of each of the n sets of values is set based upon the resources needed to sort the subset of values.

Various embodiments are described, wherein the value of L is determined based upon the noise level of the physical devise in the PUF system.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
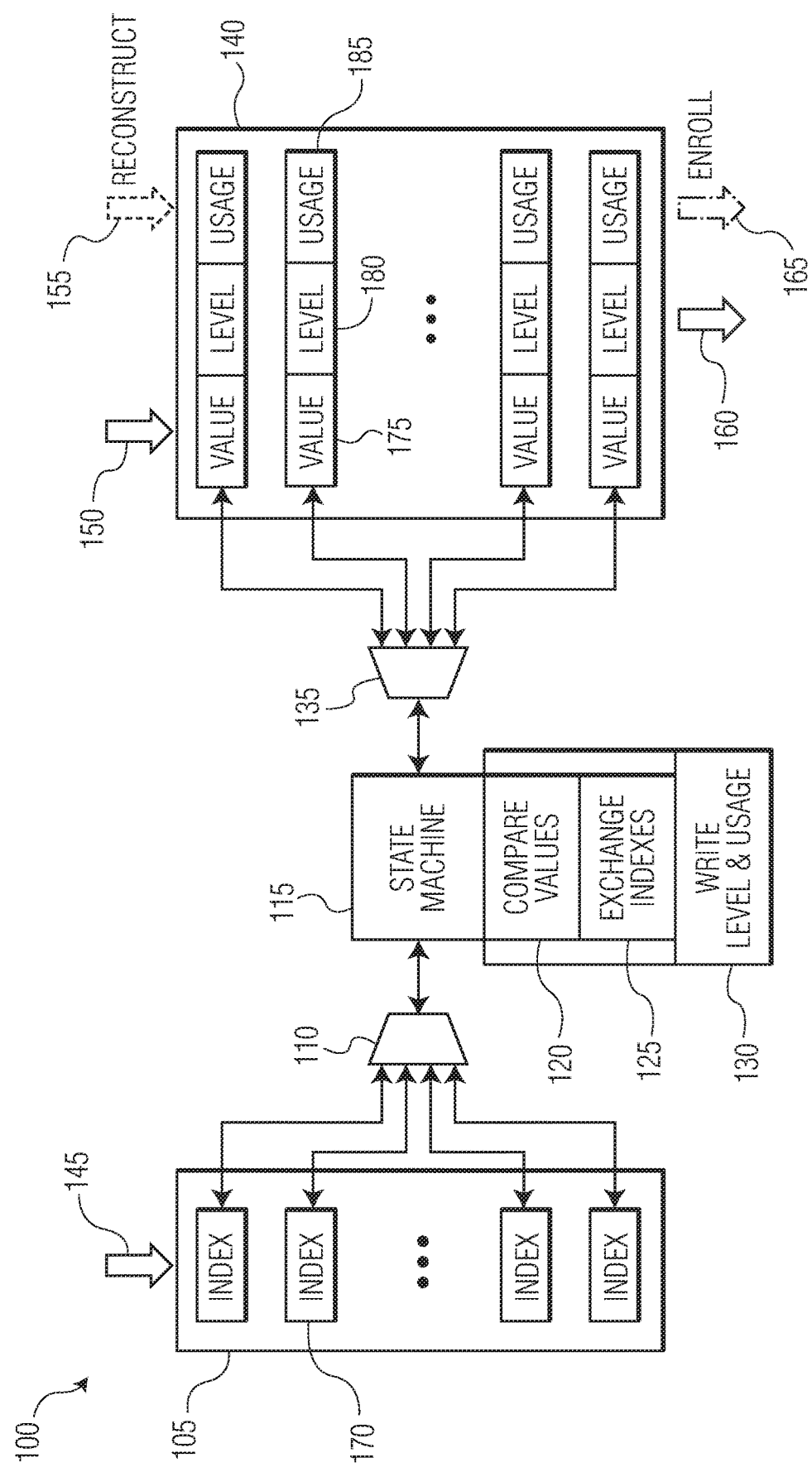
FIG. 1 illustrates a local ranking system that is a part of a hardware implementation of the enrollment and reconstruction process.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

For physical unclonable functions (PUFs) one usually must extract some digital values from analog sources in a way that the same value can be extracted again by using some helper data. If there is noise in these sources, which is normally the case, then some error correction needs to be added on top to remove these errors again. The more noise there is the more error correction is needed, which typically is quite expensive in the sense that more and more analog sources are needed, and hence also more helper data is needed. This approach only works up to an error rate of <50%, but typically is only implemented up to 25-40%, because then the coding overhead and effort already gets quite big.

The embodiments described herein may extract some entropy from noisy sources in a repeatable way, which is robust against such noise, such that the same extraction-value is always obtained or just a few errors occur, depending on the selected parameters and noise.

The main idea is to sample some digitized/digital values from some (typically analog) sources in a fixed order and sort these sources according to these values. This sorting could also happen by some other means, e.g., by direct physical pairwise comparisons. After sorting the middle ranks of values are ignored resulting in a gap and the lower ranks are labelled with 0 and the higher ranks are labelled with 1. This gap may be sized such that the noise is smaller than this gap. The result is then a string of these labels in the original order but ignoring the values in the middle ranks. This may be done using small groups of sources, and the process is repeated for several groups, to keep the sorting simple. This process may be called local ranking.

The main use case of the embodiments described herein are in PUFs, but they could also be of interest in other applications. The general setup includes a number of analog or already digitized sources or values from which some number of bits are to be constructed or extracted, such that a future time the same set of bits may be obtained either exactly or with very few errors. If such errors occur, they may be corrected by some additional error correction code. Many different sources of values may be used, but in describing the PUF system a ring oscillator will be used as an example. The frequency of a number of ring oscillators is sampled to provide the values used to generate the bits. This sampling is noisy, so some additional error correction may be applied afterwards, such that the process does not need to be 100% error free, but the process reduces the error level by some degree.

As explained above the PUF system begins by receiving a set of sampled frequency values from a set of ring oscillators. As mentioned above, other physical sources and values may be used as well. The PUF system then sorts the values and only selects the most extreme ones, i.e., the highest and lowest frequency values, such that there is some gap between two groups. The number of extreme values may be determined during implementation depending on the noise level of the sampled device. The number of highest and lowest values selected will be called the level size L. The overall number of ring oscillators and their related values may be divided into n smaller groups of size G, such that the size G of the groups stays manageable, e.g., 16, 32 or 64 values per group (but the size G does not need to be a power of two). Because the groups of size G are to be sorted, as the value of G increases the sorting operation becomes more resource intensive. As a result, the PUF system will be implemented to consider group size versus resource usage. After sorting the values per group, the L lowest and L highest values are labelled with a level tag 0 or 1 respectively. A usage tag is associated with the samples from each of the ring oscillators, and the usage tag is set to 1 for the L highest values and L lowest values, and the remaining values have a usage tag set to 0. Next, the values are taken in their original order and bits based on the associated level tag are output for each value if the associated usage tag is 1, otherwise the value and its level tag are ignored. This produces a bit string of length 2•L per group, so in total after concatenating the strings of all groups (in a fixed order) a bit-string of length 2•n•L is produced. The usage tags for each group are stored as helper data to indicate which 2•L locations in each group have been selected resulting in n•G helper bits being stored of which 2•n•L have a value of 1.

When PUF system later reconstructs this bit-string, it will use the stored helper data to select only the 2•L values per group that were used during the so-called enrollment (which was explained above). The PUF system will then sort these values per group and label them again with a level-tag, 0 for the L lowest values and 1 for the L highest values. And again, the PUF system will build a bit-string from these level-tags by ordering them in the original order of the values. Having done this for each group and concatenating all these strings will result in the same or almost the same string that was generated during the enrollment process if the noise was not too large with respect to the gap between the low and high levels in each group. Further, error correction coding may be used to correct for such errors.

The method of producing the initial bitstream (enrollment) will now be described using the following pseudo code.

```
ENROLL
1. Input:
   a. v[i,j]; i := 1, ..., n; j := 1, ..., G
2. bitStream := empty string
3. for i := 1, ..., n:
   a. group := v[i,1], ..., v[i,G]
   b. for j := 1, ..., G:
      i. r[j] := rank of v[i,j] in group; lowest value has rank 1, highest value rank G
   c. for j := 1, ..., G:
      i. if r[j] <= L:
         1. levelTag[j] := 0
         2. usageTag[i,j] := 1
      ii. else if r[j] > G - L:
         1. levelTag[j] := 1
         2. usageTag[i,j] := 1
      iii. else
         1. usageTag[i,j] := 0
   d. for j := 1, ..., G:
      i. if usageTag[i,j] == 1:
         1. bitStream | | = levelTag[j]
4. return bitStream and usageTag array
```

The method begins at step 1a by receiving and storing the values from the ring oscillator in a two dimensional array v[i,j]. The index i specifies the group number, and the index j specifies the element number in the group. Next at step 2, the value bitStream, which will hold the output bit stream at the end of the method, is initialized to the empty string.

At step 3 a loop is started that loops through the n different groups. At step 3a, the loop variable array group is initialized to the values v[i,j] for the group i. Next in step 3b, the rank of each element of group is determined and stored in the array r[j]. The rank specifies the values rank from lowest to highest among the values in the array group, hence the lowest value will have a rank of one, and the highest value will have a rank of value G. Then at step 3c, a loop is started that loops through each value of the array r[j]. At step 3.c.i, if the rank r[j] is less than or equal to L then it is in the lowest sub-group, and hence levelTag[j] is set to 0 and the usageTag [i,j] is set to 1. At step 3.c.ii, if the rank r[j] is greater than G-L. then it is in the highest sub-group, and hence levelTag [j] is set to 1 and the usageTag[i,j] is set to 1. At step 3.c.iii, usageTag[i,j] is set to 0 because this value is in the middle.

Next, at step 3d, a loop is started to loop through each value of usageTag[i,j] for the current group i. If usageTag [i,j] is equal to 1, then levelTag[j] corresponding to the usage tag is appended to bitstream. Finally, at step 4 bitStream and usageTag arrays are returned.

This enrollment process will be completed when a PUF system comes online to generate the bitstream unique to the PUF.

Next, the method of producing a reconstructed bitstream (reconstruction) will now be described using the following pseudo code.

---

RECONSTRUCT

1. Input:
   a. v[i,j]; i := 1, ..., n; j = 1, ..., G
   b. usageTag[i,j]; i := 1, ..., n; j = 1, ..., G
2. bitStream := empty string
3. for i := 1, ..., n:
   a. k := 0
   b. for j := 1, ..., G:
      i. if usageTag[i,j] == 1:
         1. k += 1
         2. group[k] := v[i,j]
   c. for j := 1, ..., 2*L:
      i. r[j] := rank of g[j] in group; lowest value has rank 1, highest value rank 2*L
   d. for j := 1, ..., 2*L:
      i. if r[j] <= L:
         1. levelTag[j] := 0
      ii. else:
         1. levelTag[j] := 1
   e. for j := 1, ..., 2*L:
      i. bitStream | | = levelTag[j]
4. return bitstream

---

The method begins at step 1a by receiving and storing the values from the ring oscillator in a two dimensional array v[i,j] and by retrieving the previously stored usageTag[i,j] values. Next at step 2, the value bitStream, which will hold the output bit stream at the end of the method, is initialized to the empty string.

At step 3 a loop is started that loops through the n different groups. At step 3a, a counter variable k will be initialized. The variable k will be used to index a variable group that stores values identified by the usage tag. Next in step 3b, a loop is started to go through the different values of usageTag for the group i. If usageTag[i,j] is equal to 1, then the counter k is incremented, and the value[i,j] associated with the usage tag is stored in the array group[k]. Next in step 3c, the rank of each element of group[j] is determined and stored in the array r[j]. As before, the rank specifies the values rank from lowest to highest among the values in the array group, hence the lowest value will have a rank of one, and the highest value will have a rank of value 2*L. Then at step 3d, a loop is started that loops through each value of the array r[j]. At step 3.d.i, if the rank r[j] is less than or equal to L then it is in the lowest sub-group, and hence levelTag[j] is set to 0. At step 3.d.ii, otherwise the rank r[j] is in the highest sub-group, and hence levelTag[j] is set to 1.

Next, at step 3e, a loop is started to loop through each value of levelTag[j] for the current group i. In the loop each levelTag[j] value is appended to bitstream. Finally, at step 4 bitStream array is returned.

This reconstruction process will be performed when the bitstream value associated with the PUF system is needed.

FIG. 1 illustrates a local ranking system that is a part of a hardware implementation of the enrollment and reconstruction process described above. The PUF system 100 includes index storage 105, index multiplexer 110, state machine 115, value storage 140, and value multiplexer 135. The index storage 105 is initialized 145 with a set of monotonically increasing indexes 170 that correspond to a set of storage values 175, 180, 185 stored in the value storage 140. The indices 170 in the index storage 105 are used to sort the storage values 175, 180, 185 as it is easier to sort the indices than all of the storage values 175, 180, 185, requiring less movement of data during the sorting operation. The state machine 115 accesses and writes the indices 170 via the index multiplexer 110. In a similar manner, the value multiplexer 135 allows the state machine 115 to read and write values in the storage values 175, 180, 185. The storage values include a value 175, which in the ring oscillator example is a frequency value, a levelTag value 180, and a usageTag value 185.

During the enrollment processes, a set of values 175 are read 150 into the value storage 140. Also, the index values 170 are initialized 145. If a large group of received values is split into n groups, the set of values 150 are one of the n groups, and the process is repeated for each of the n groups as described above. The state machine 115 then compares values 120 in the group and then depending upon the comparison, exchanges the indices 125 as needed. This is repeated until a complete sort of the group of values is achieved. The state machine 115 then selects the L highest values and the L lowest values 130 based upon the sorted indices 170. For the L highest values, the levelTag values 180 are set to 1 and the usageTag values 185 are set to 1. For the L lowest values, the levelTag values 180 are set to 0 and the usageTag values 185 are set to 1. For the remaining values, the usage tags are set to 0. This may be done explicitly or by initializing all usage tags to 0. The state machine 115 can then step through usageTags 185 in order, and when the usage tag is 1, output 130 a bit based upon the corresponding levelTag 180 value. This results in the output bit stream 160. Also, the state machine 115 outputs 165 the usageTag values 185 associated with each value for use in later reconstructing the bitstream. If the values 175 are split into groups, then each group may be processed and then the final bitstream 160 and usageTag values 185 output. Depending upon the level of noise in the local oscillator system (or other physical system used), during the process of writing the bitstream, error correction may be added to the output bit stream.

During the reconstruction processes, a set of values 175 are read 150 into the value storage 140. Also, the usageTag values 185 from the enrollment process are read in or received 155. The index values 170 are also initialized 145. If a large group of received values is split into n groups, the set of values 150 are one of the n groups, and the process is repeated for each of the n groups as described above. The state machine 115 then selects just the values in the group that have a usageTag of 1. This may be done by removing the, indices 170 that have a usageTag of 0 from the indices 170 or alternatively, these indices may be set to a large value or to zero to note that such values are not to be used in the reconstruction. The state machine 115 then compares values 120 in the remaining group and then depending upon the comparison, exchanges the indices 125 as needed. This is repeated until a complete sort of the remaining group of values is achieved. The state machine 115 then selects the L highest values and the L lowest values 130 based upon the sorted indices 170. For the L highest values, the levelTag values 180 are set to 1. For the L lowest values, the levelTag values 180 are set to 0. The state machine 115 can then step through usageTags 185 in order, and when the usage tag is 1, output 130 a bit based upon the corresponding levelTag 180 value. This results in the output bit stream 160. If the values 175 are split into groups, then each group may be processed and then the final bitstream 160 output. Depending upon the level of noise in the local oscillator system (or other physical system used), during the process of writing the bitstream, error correction may be added to the output bit stream.

The ranks that are the result of sorting the sampled values may be computed in many ways and depends on the size of the values and the requirements given regarding speed, power or implementation size. For example, one could use a simple insertion sort algorithm, a bubble sort or a mix of a parallel bubble sorts and following merge sort. Typically for those kinds of sorting algorithms one needs to compare two values and do something depending on the result. Instead of already having two sampled values, one could also do a kind of online-comparison, e.g., comparing two voltages with a comparator circuit. This would reduce the needed storage space and could be used in cases where the analog sources are difficult to sample but easy to compare, e.g., small differences in voltage or time. If the noise is relatively independent for each comparison or sampling and this online comparison or sampling does not take too long, one could also do multiple comparisons or samplings and then take a majority vote or mean value (for implementation one would probably take the sum, because of a simpler implementation and avoiding possible information loss due to rounding errors). If the noise is rather similar for a series of sequential comparisons or samplings, then this repetition does not help very much. This could for example happen if the noise is rather dependent on voltage and temperature or is slowly changing over time (so called aging). A local ranking approach may also be applied in cases where the values are changing, but their order stays mainly the same.

A possible optimization for this method is to not output the last bit of a group, because this is already 100% determined by the first 2L-1 bits of the group (there will always be L 0-bits and also L 1-bits). If all orderings/rankings in a group have the same probability 1/G!, then 2L or 2L-1 (with the optimization) bits per group with an entropy of $$\log_2\binom{2L}{L}$$

would result, which is computed for a few values of L in the following table:

| L | 2L − 1 | Entropy |
|---|--------|---------|
| 1 | 1 | 1.00 |
| 2 | 3 | 2.58 |
| 3 | 5 | 4.32 |
| 4 | 7 | 6.13 |
| 6 | 11 | 9.85 |
| 8 | 15 | 13.65 |
| 10 | 19 | 17.50 |
| 12 | 23 | 21.37 |
| 16 | 31 | 29.16 |
| 24 | 47 | 44.87 |
| 32 | 63 | 60.67 |

So, the "raw-bits" will not have full entropy, but also will not be far off. Of course, if the values are somehow biased this is not true anymore and entropy has to be determined by other means.

Figure 2:
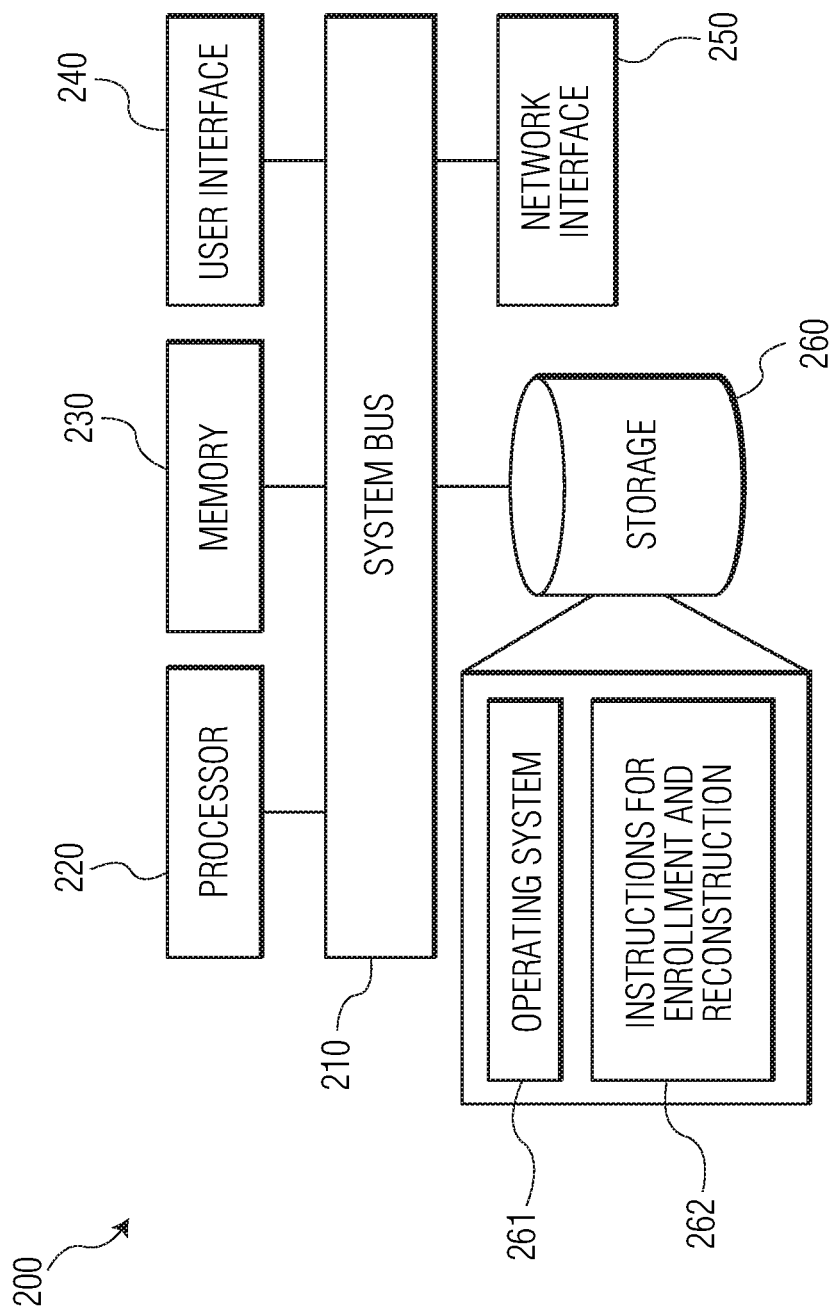
FIG. 2 illustrates an exemplary hardware diagram for implementing a local ranking system using a processor to implement the enrollment and reconstruction process.

FIG. 2 illustrates an exemplary hardware diagram 200 for implementing a local ranking system using a processor to implement for example the pseudo code described above. As illustrated, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, microcontroller, graphics processing unit (GPU), field programmable gate array (FPGA), application-specific integrated circuit (ASIC), or other similar devices.

The memory 230 may include various memories such as, for example L1, L2, or L3 cache or system memory. As such, the memory 230 may include static random-access memory (SRAM), dynamic RAM (DRAM), flash memory, read only memory (ROM), or other similar memory devices.

The user interface 240 may include one or more devices for enabling communication with a user as needed. For example, the user interface 240 may include a display, a touch interface, a mouse, and/or a keyboard for receiving user commands. In some embodiments, the user interface 240 may include a command line interface or graphical user interface that may be presented to a remote terminal via the network interface 250.

The network interface 250 may include one or more devices for enabling communication with other hardware devices, such as for example the ring oscillators. For example, the network interface 250 may include a network interface card (NIC) configured to communicate according to the Ethernet protocol or other communications protocols, including wireless protocols. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200. The storage 261 may include instructions for implementing enrollment and reconstruction processes described above.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for generating a bit stream in a physical unclonable function (PUF) system, comprising:
   receiving a set of values from a plurality of physical devices in the PUF system in a first order based upon a time when values in the set of values are generated, wherein each value of the set of values has a corresponding levelTag value and a corresponding usageTag value;
   sorting the set of values into a second order wherein the second order includes the values being in one of an increasing or decreasing order;
   in response to the sorting the set of values, determining L highest sorted values and L lowest sorted values using the sorted set of values in the second order, wherein L is a level setting that is based upon noise errors produced by the plurality of physical devices so that after the bit stream is generated, the generated bit stream may be reproduced with reduced noise errors using the L highest sorted values and the L lowest sorted values;
   for each of the L highest sorted values;
      setting a corresponding levelTag value to a first bit value; and
      setting a corresponding usageTag value to a first usage value, the first usage value that indicates that levelTag value for each of the L highest sorted values for the corresponding value is to be used to generate the bit stream;
   for each of the L lowest sorted values;
      setting a corresponding levelTag value to a second bit value; and
      setting a corresponding usageTag value to the first usage value, wherein the first bit value is different from the second bit value;
   setting a usageTag value for all other values that are not the highest L highest sorted values or the lowest L lowest sorted values to a second usage value, the second usage value that indicates that corresponding usageTag value for all other values is not to be used to generate the bit stream;
   generating the bitstream using levelTag values that have corresponding usageTag value of the first usage value, wherein the levelTag values are ordered according to the first order.

2. The method of claim 1, further comprising outputting the usageTag values from the PUF system.

3. The method of claim 1, wherein generating the bitstream using the levelTag values includes generating a first 2L-1 bits and ignoring last generated bit.

4. The method of claim 1, further comprising receiving n sets of values and repeating the method of claim 1 for each of the n set of values.

5. The method of claim 4, wherein a size of each of the n sets of values is set based upon resources needed to sort the set of values.

6. A method for generating a bit stream in a physical unclonable function (PUF) system, comprising:
   receiving a set of values from a plurality of physical devices in the PUF system in a first order based upon a time when values in the set of values are generated, wherein each value of the set of values has a corresponding levelTag value and a corresponding usageTag value;
   receiving a set of usageTag values corresponding with the set of values, wherein a first usage value indicates that a levelTag for a corresponding value is to be used to generate the bit stream and a second usage value indicates that a levelTag for a corresponding value is not to be used to generate the bit stream;
   generating a subset of the set of values, wherein the subset of the set of values includes values with an associated corresponding usageTag value of the first usage value;
   sorting the subset of values into a second order wherein the second order includes the values being in one of an increasing or decreasing order;
   in response to the sorting the subset of values, determining L highest sorted values and the L lowest sorted values using the sorted subset of values in the second order, wherein L is a level setting that is based upon noise errors produced by the plurality of physical devices so that the generated bit stream may be reproduced with reduced noise errors;

for each of the L highest sorted values in the subset, setting a corresponding levelTag value to a first bit value;

for each of the L lowest sorted values in the subset, setting a corresponding levelTag value to a second bit value, wherein the first bit value is different from the second bit value; and generating the bitstream using levelTag values, wherein the levelTag values are ordered according to the first order.

7. The method of claim 6, further comprising outputting the bitstream from the PUF system.

8. The method of claim 6, wherein generating the bitstream using the levelTag values includes generating a first 2L-1 bits and ignoring last generated bit.

9. The method of claim 6, further comprising receiving n sets of values and repeating the method of claim 6 for each of the n set of values.

10. The method of claim 9, wherein a size of each of the n sets of values is set based upon resources needed to sort the subset of values.

11. A physical unclonable function (PUF) system, comprising:
a memory;
a processor coupled to the memory, wherein the processor is further configured to:
receive a set of values from a plurality of physical devices in the PUF system in a first order based upon a time when values in the set of values are generated, wherein each value of the set of values has a corresponding levelTag value and a corresponding usageTag value;
sort the set of values into a second order wherein the second order includes the values being in one of an increasing or decreasing order;
in response to the sorting the set of values, determine L highest sorted values and L lowest sorted values using the sorted set of values in the second order, wherein L is a level setting that is based upon noise errors produced by the plurality of physical devices so that after the bit stream is generated, the generated bit stream may be reproduced with reduced noise errors using the L highest sorted values and the L lowest sorted values;
for each of the L highest sorted values;
set a corresponding levelTag value to a first bit value; and
set a corresponding usageTag value to a first usage value, the first usage value that indicates that levelTag value for each of the L highest sorted values for corresponding value is to be used to generate the bit stream;
for each of the L lowest sorted values;
set a corresponding levelTag value to a second bit value; and
set a corresponding usageTag value to the first usage value, wherein the first bit value is different from the second bit value;
set a usageTag value for all other values that are not the L highest sorted values or the L lowest sorted values to a second usage value, the second usage value indicates that the usageTag value for all other values is not to be used to generate the bit stream;
generate the bitstream using levelTag values that have corresponding usageTag value of the first usage value, wherein the levelTag values are ordered according to the first order.

12. The system of claim 11, wherein the processor is further configured to output the usageTag values from the PUF system.

13. The system of claim 11, wherein generating the bitstream using the levelTag values includes generating a first 2L-1 bits and ignoring last generated bit.

14. The system of claim 11, wherein the processor is further configured to receive n sets of values and repeat the processor steps of claim 11 for each of the n set of values.

15. The method of claim 14, wherein a size of each of the n sets of values is set based upon resources needed to sort the set of values.

16. A physical unclonable function (PUF) system, comprising:
a memory; a processor coupled to the memory, wherein the processor is further configured to:
receiving a set of values from a plurality of physical devices in the PUF system in a first order based upon a time when values in the set of values are generated, wherein each value of the set of values has a corresponding levelTag value and a corresponding usageTag value;
receiving a set of usageTag values corresponding with the set of values, wherein a first usage value indicates that a levelTag for a corresponding value is to be used to generate the bit stream and a second usage value indicates that a levelTag for a corresponding value is not to be used to generate the bit stream;
generating a subset of the set of values, wherein the subset of the set of values includes values with an associated corresponding usageTag value of the first usage value;
sorting the subset of values into a second order wherein the second order includes the values being in one of an increasing or decreasing order;
in response to the sorting the subset of values, determining L highest sorted values and the L lowest sorted values using the sorted subset of values in the second order, wherein L is a level setting that is based upon noise errors produced by the plurality of physical devices so that the generated bit stream may be reproduced with reduced noise errors;
for each of the L highest sorted values in the subset, setting a corresponding levelTag value to a first bit value;
for each of the L lowest sorted values in the subset, setting a corresponding levelTag value to a second bit value, wherein the first bit value is different from the second bit value; and
generating the bitstream using levelTag values, wherein the levelTag values are ordered according to the first order.

17. The system of claim 16, wherein the processor is further configured to output the bitstream from the PUF system.

18. The system of claim 16, wherein generating the bitstream using the levelTag values includes generating a first 2L-1 bits and ignoring last generated bit.

19. The system of claim 16, wherein the processor is further configured to output the bitstream from the PUF system and receive n sets of values and repeating the processor steps of claim 16 for each of the n set of values.

20. The system of claim 19, wherein a size of each of the n sets of values is set based upon resources needed to sort the subset of values.

* * * * *